April 19, 1960

A. R. RIDDERSTROM 2,932,834

RIB LAYING APPARATUS

Filed Feb. 27, 1957

INVENTOR
ANDREW R. RIDDERSTROM

April 19, 1960

A. R. RIDDERSTROM

2,932,834

RIB LAYING APPARATUS

Filed Feb. 27, 1957

INVENTOR
ANDREW R. RIDDERSTROM

United States Patent Office 2,932,834
Patented Apr. 19, 1960

2,932,834

RIB LAYING APPARATUS

Andrew R. Ridderstrom, Pomona Park, Fla.

Application February 27, 1957, Serial No. 642,737

16 Claims. (Cl. 12—20)

This invention relates generally to the art of shoemaking and, more particularly, to apparatus for applying an upstanding rib around the periphery of an insole to provide for the attachment of an upper thereto.

One object of the present invention is the provision of rib applying apparatus which simultaneously forms and applies a rib around the periphery of an insole, said rib being firmly and uniformly attached to the insole to provide a strong and high quality attachment between the rib and insole. Pursuant to this object of the present invention complemental rolls simultaneously form and apply the rib and feed or advance the rib with the insole, and the rib so formed and layed is in a tensionless condition on leaving said rolls.

Another object of the present invention is the provision of generally improved rib applying apparatus which is of simple design and construction, economical to manufacture and use, and which readily lends itself to efficient and low cost mass production of ribbed insole assemblies.

Another object of the present invention is the provision of an improved margin adjusting arrangement in rib applying apparatus of the general character referred to above.

Other objects, features and advantages of the invention will become apparent as the description thereof proceeds when considered in connection with the accompanying illustrative drawings.

In the drawings which illustrate the best mode now contemplated by me for carrying out my invention:

Fig. 3 is a front view thereof;

Fig. 8 is a fragmentary side elevational view showing the complemental rolls in the process of forming and applying a rib to an insole;

Figure 14:
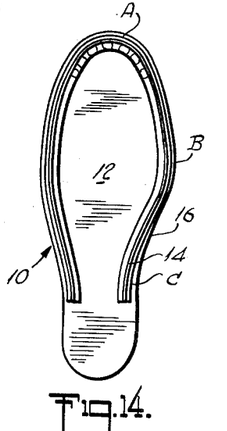
Fig. 14 is a top plan view of a ribbed insole assembly formed according to the present invention.

Referring to the drawings, and more particularly to Fig. 14 thereof, there is shown a ribbed insole assembly 10 which comprises an insole 12 having a rib 14 adhesively secured around the periphery thereof in spaced relation with the peripheral edge 16, the spacing between said edge and the rib being denoted the margin. As is well known to those skilled in the art the upstanding rib 14 is adapted to be stitched to the lower edges of an upper to provide for the securement of the upper to the insole. The rib applying apparatus 18 simultaneously forms and applies the rib around the periphery of the insole to provide a strong and high quality adhesive rib and insole attachment in the manner to be described in detail hereinafter.

Figure 2:
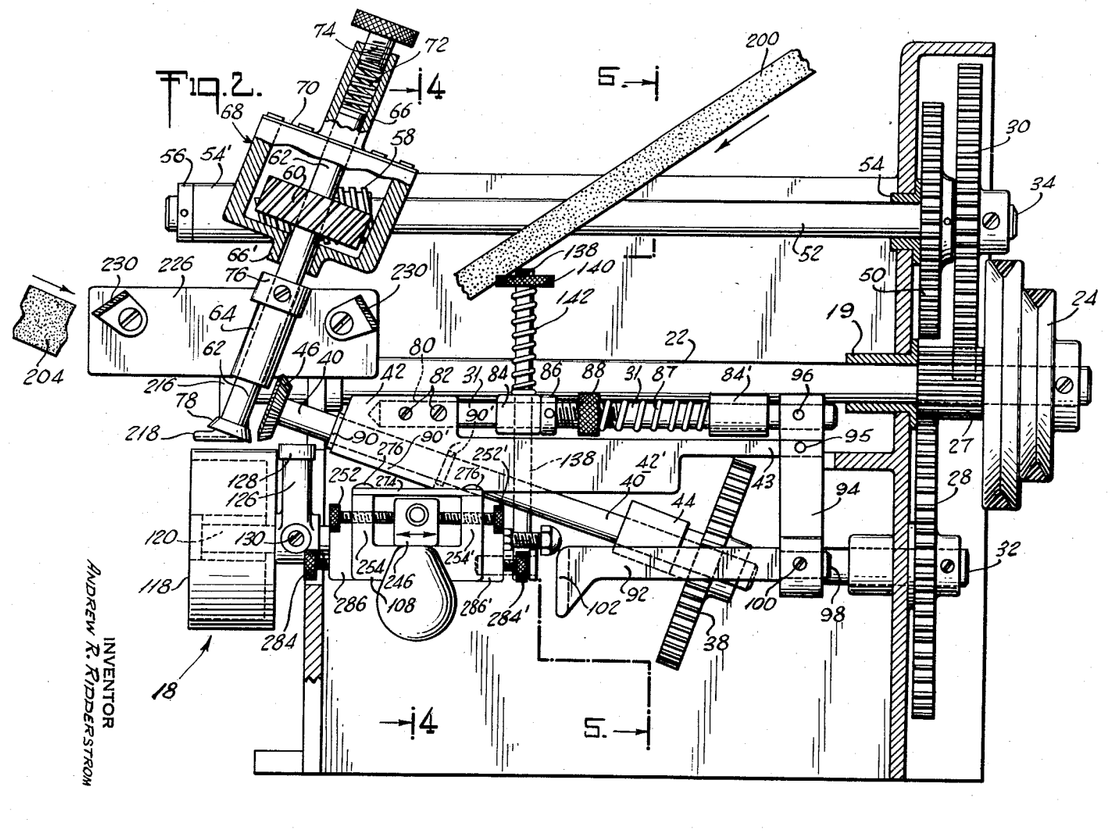
Fig. 2 is a side elevational view thereof with parts broken away.

The apparatus 18 may be bench or floor mounted and comprises a frame 20 which provides the main structural support for the various components to be described. The main driveshaft 22 is journalled for rotation in the bearings 19 and 19' of frame 20 and said driveshaft carries a pulley 24, which is secured to one end, and an eccentrically mounted hammer 26 at its opposite end adjacent to the bearing 19'. The pulley 24 is adapted to be connected to a suitable source of power such as an electric motor through a conventional belt drive. Secured to the driveshaft 22 intermediate bearing 19 and pulley 24 is a gear 27 which is in mesh with the gears 28 and 30 secured to shafts 32 and 34, resp. The shaft 32 is journalled for rotation in the frame and has a worm gear 36 keyed thereto for rotation therewith, said gear 36 being in mesh with gear 38 which is keyed to the angularly disposed shaft 40. The shaft 40 is journalled for rotation in the parts 42 and 44, the latter part constituting a stationary part of the frame. The end of shaft 40 has a feed roll 46 secured thereto for rotation therewith. The gear 30 is in integral relation with the gear 48 which in turn is in mesh with the gear 50, the latter gear being keyed to the shaft 52 which is journalled for rotation in the bearings 54 and 54' of the frame. The shaft 52 is secured against axial displacement in the frame by the stop collar 56 which is pinned to the shaft and the latter has a worm gear 58 in fixed relation therewith which is in mesh with the worm-wheel 60 which is keyed to the shaft 62 (Fig. 2). The shaft 62 is disposed at substantially right angles to the shaft 40 and shaft 62 is journalled for rotation in the frame part 64 and the tubular sleeves 66 and 66' of the gear housing 68. The housing 68 is fixed to the frame and is provided with a removable cover plate 70, the sleeve 66 forming a part of said plate. The upper end of shaft 62 terminates in sleeve 66 and said shaft is axially spring biased in a downward direction by the compression spring 72 which is positioned in said sleeve and retained therein by the stop screw 74 which is threaded into the end of sleeve 66. The screw 74 provides for the adjustment of the biasing force of spring 72 and it will be apperant that such force is increased by threading said screw into the sleeve. Fixed to the shaft 62 is a stop collar 76 which coacts with the frame part 64 to limit the axial movement of said shaft in a downward direction. Fixed to the lower end of shaft 62 is a creaser roll 78 which coacts with its complemental roll 46 in the manner to be described in detail below. From the above it will be apparent that on the rotation of the main driveshaft 22 from a suitable power source (not shown) the feed and creaser rolls will be rotated and said rolls rotate at preferably the same rotational speed. More particularly, the feed roll is driven through the intermediation of meshed gears 27, 28 and 36, 38 whereas the creaser roll is driven through the intermediation of meshed gears 27, 30, 48, 50, and 58, 60.

The shaft 40 and feed roll 46 are spring biased towards the creaser roll 78 in the manner now to be described. The shaft 31 is secured in the aperture 80 of the part 42 by the screws 82 and said shaft is slidably mounted in companion aligned apertures provided in the frame parts 84 and 84'. The shaft 31 is provided with a stop collar 86 which coacts with the part 84 to limit the axial movement of said shaft to the left viewing Fig. 2. Positioned on the shaft 31 is a compression spring 87 which extends between the part 84' and the adjustable stop collar 88, the latter providing an adjustment for the biasing force exerted by the spring 87. To increase the biasing force the collar 88 is threaded on shaft 31 towards the part 84' to thus further compress said spring. Thus the feed roll 46 is spring biased towards the creaser roll 78 and is movable away from the latter against the action of the spring 87. It will be noted that the shaft 40 is fixed against axial displacement relative to the part 42 by the stop collars 90 and 90' which are secured to said shaft adjacent said part. The arm 92 is in fixed relation with shaft 31 through the intermediation of the bridging part 94 which is keyed to the end of shaft 31 as indicated at 96 and to the end shaft 98 of arm 92 as indicated at 100. The part 42 has an extension 42' which terminates in a shaft 43 which is keyed to the part 94 as indicated at 95. The arm 92 terminates in an inwardly turned arcuate plate or cam follower 102 (Figs. 1, 2, and 5) which is adapted for a purpose to be described below.

The apparatus 18 further comprises a handle assembly 104 which is constituted by a handle 106 and an integral extension part 108, said handle assembly being movable both vertically and horizontally or laterally. The handle assembly is mounted in relation to the yoke 110 which has aligned fittings 112 mounted on the fixed shaft 114, the latter being suitably secured in the frame. The yoke 110 is pivotally mounted on the shaft 114 and is restrained against displacement on said shaft by the stop collars 116. The bottom support roll 118 is freely rotatable on shaft 120 which is flattened on its inner end as indicated at 122 and said flattened part is secured to the extension part 108 by means of the bolt 124 which is threaded into part 108. Mounted on the shaft 120 adjacent to the support roll 118 is a guide post 126 which carries a freely rotatable guide roll 128 at its upper end. The guide roll 128 projects above the roll 118 and is rotatable about a vertical axis. The guide post 126 is adjustably mounted on shaft 120 about the axis thereof and is clamped in adjusted position by means of the set screw 130. Thus the support and guide rolls are disposed in fixed relation with the handle assembly 104 and are movable in unison therewith.

Secured to the extension part 108 and laterally projecting therefrom is a pin 132 (Figs. 1 and 4) upon which is mounted the terminal fitting 134 of the rod 136, the latter extending through the elongated aperture 139 in the frame part 84. The rod 136 is threaded at its end portion 138 for the reception of the threaded adjusting member 140, there being provided a compression spring 142 extending between said adjusting member and the frame part 84. The biasing force of spring 142 may be adjusted by the member 140, said spring being effective to bias the handle assembly 104 into engagement with the yoke 110. The extension part 108 terminates in a forked fitting 146 which is interengaged with the pivot pin 148, the latter forming a pivot axis for the horizontal or lateral movement of the handle assembly. The pin 148 has an enlarged head 150 which forms the bearing surface for the fitting 146, said pin having a cross pin 152 secured thereto which extends across said fitting so that when the handle assembly is moved downwardly the fitting 146 will engage the cross pin 152 and the yoke 110 will move in unison with the handle assembly. The pin 148 extends through the aperture 154 in the yoke and is secured thereto by means of the nuts 156. The yoke and handle assembly are vertically movable in unison about the shaft 114 which forms the pivotal axis for said movement whereas the handle assembly is laterally movable about the pin 148, which forms a vertical pivotal axis for the handle assembly independent of the yoke.

Figures 1, 6:
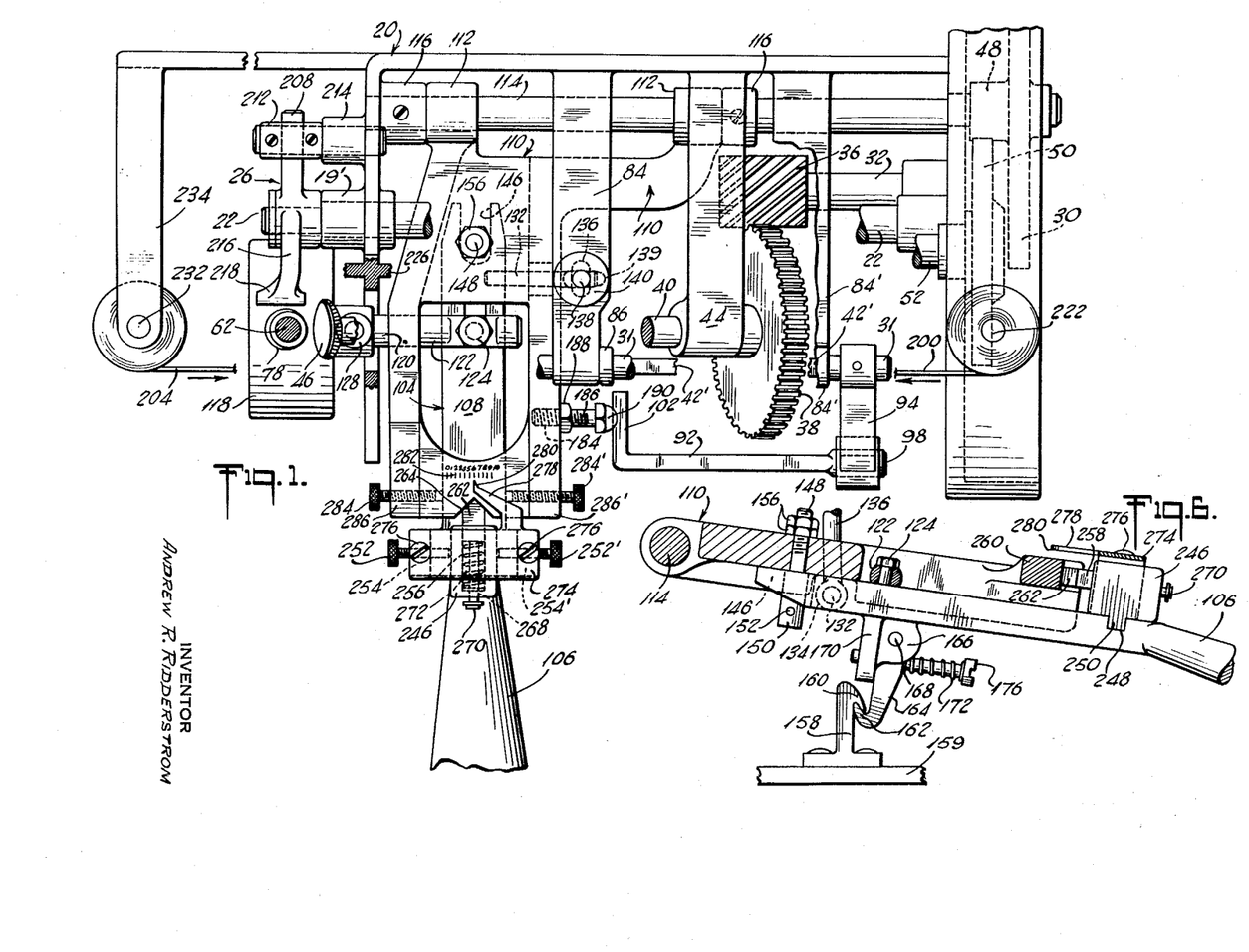
Fig. 1 is a top plan view of the rib applying apparatus of the present invention with parts broken away to reveal structural details.
Fig. 6 is a view of a fragmentary portion of Fig. 4 showing the handle assembly in the latched down inoperative position.
Figures 4, 10, 11:
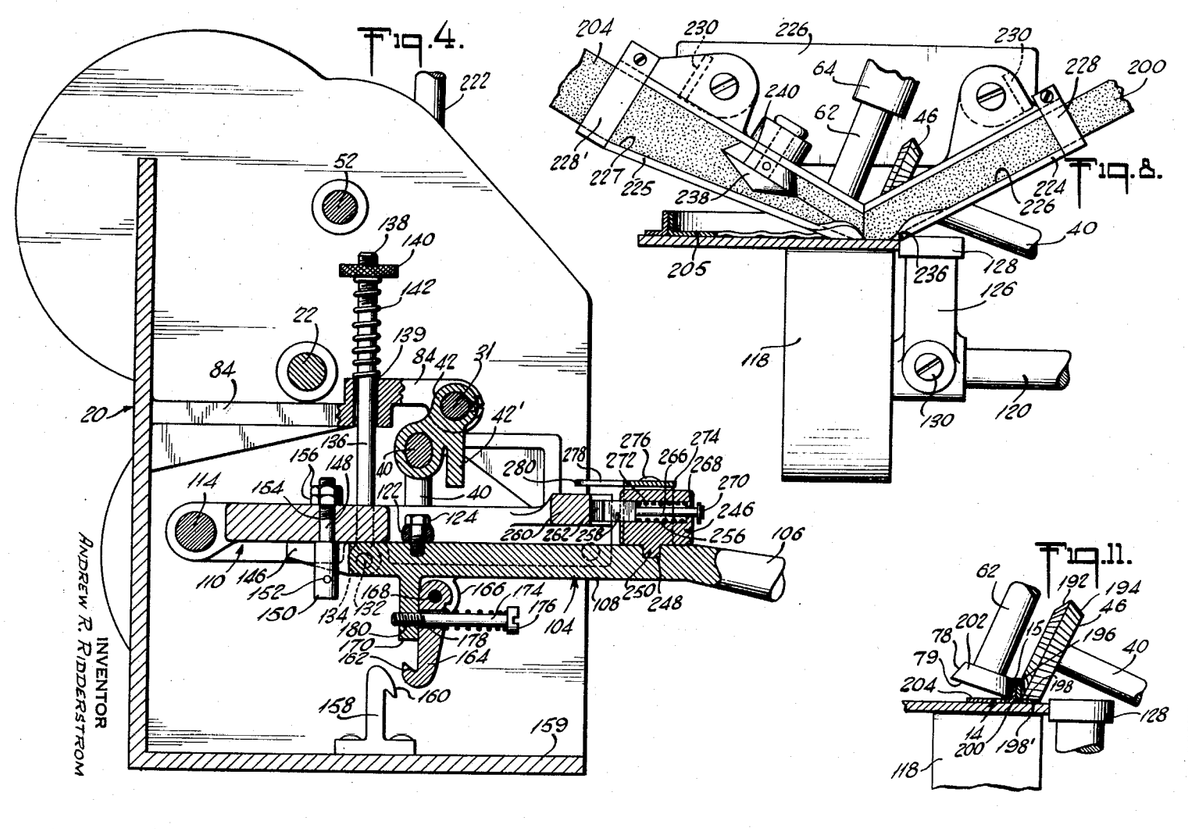
Fig. 4 is a sectional view taken on the line 4—4 of Fig. 2.
Fig. 10 is a sectional view taken on the line 10—10 of Fig. 9.
Fig. 11 is a sectional view taken on the line 11—11 of Fig. 9.
Figures 5, 7:
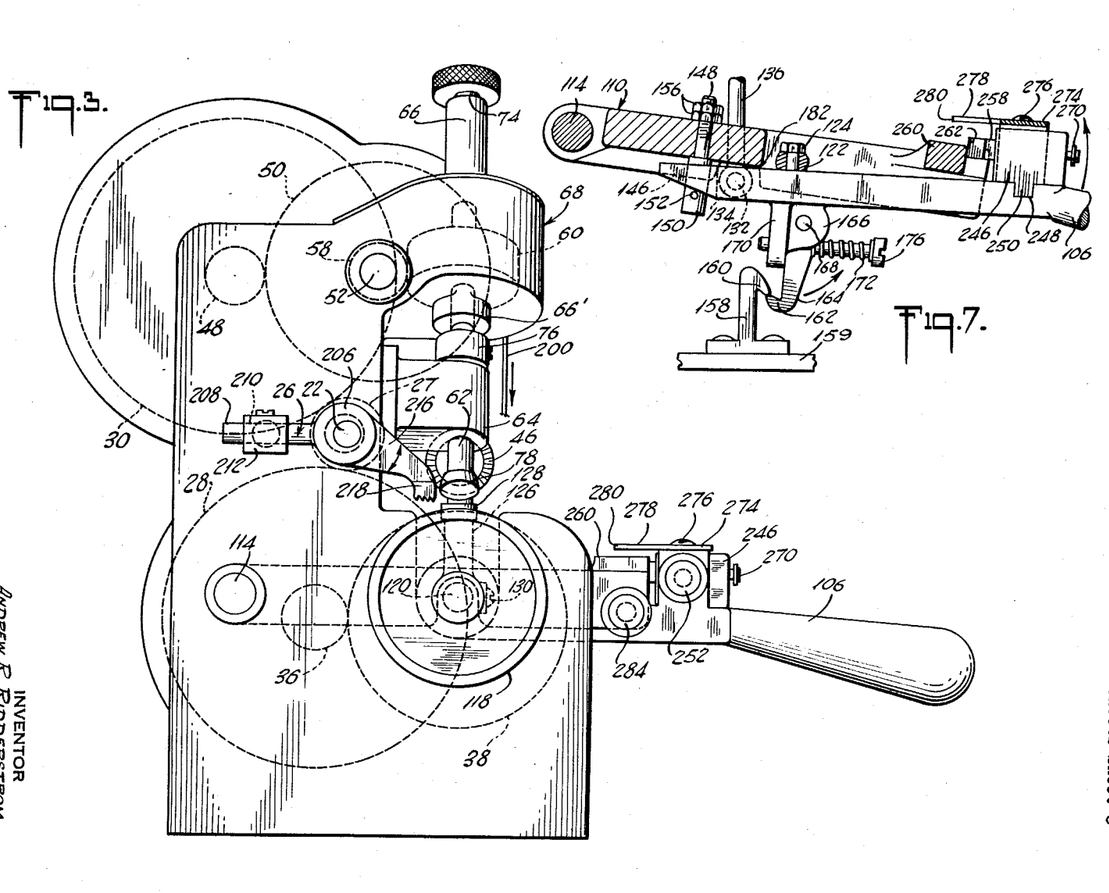
Fig. 5 is a sectional view taken on the line 5—5 of Fig. 2.
Fig. 7 is a view similar to Fig. 6 illustrating the manner of unlatching the handle assembly.
Figure 5:
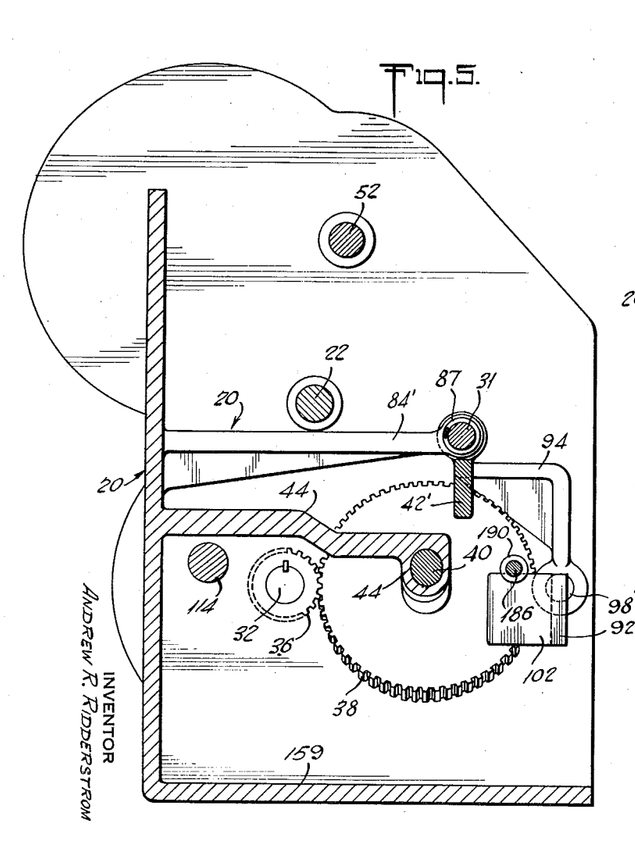

The handle assembly 104 and yoke 110 may be latched in a down position as illustrated in Fig. 6 when it is desired to separate the support roll 118 and guide roll 128 from the rolls 46 and 78 to in effect open said rolls as for example when the apparatus is inoperative. To this end the latch member 158 is suitably secured to the frame base plate 159 and said latch member is provided with a latch 160 which is adapted for releasable engagement with a companion latch 162 of the latch member 164, the latter being pivotally mounted between the spaced parts 166 by means of the pivot pin 168 which is secured to said parts 166. The parts 166 are integrally formed with extension part 108 and the part 170 which depends from said extension part. The latch member 164 is biased into engagement with part 170 by means of the companion spring 172 which surrounds the bolt 174 and which extends between the head 176 thereof and the member 164, said bolt extending through the aperture 178 provided in member 164 and being threadedly engaged in the threaded aperture 180 extending through the part 170. On the downward movement of the handle assembly and yoke the latch 162 engages the latch 160 and snaps over the latter to interlatch therewith, by virtue of the pivotal mounting of latch 162 which permits the same to cam over latch 160. To release the handle assembly and yoke from the latched position illustrated in Fig. 6, the handle assembly is raised and on being raised it fulcrums about the lower edge 182 of the yoke and the spring 142 sufficiently yields to release the latch 162 from engagement with the latch 160 (Fig. 7). On the release of the latch 162 the handle assembly and yoke may be raised in unison to the operative or up position, such as shown in Figs. 2, 4 and 8–11, in which the handle assembly is biased into engagement with the yoke but which may yield or displace therefrom a limited amount against the action of spring 142 as when sufficient pressure is applied to roll 118 during the rib laying operation. Thus the handle assembly and yoke may be conveniently latched in the down position whenever desired by the manipulation of the handle 106 by the operator.

Secured in the threaded aperture 184 of the yoke is a bolt 186 which is adjustable in said aperture and which is retained in adjusted position by the lock nut 188. The bolt 186 laterally projects from the yoke as shown in Figs. 1 and 2 and said bolt has a head 190 which defines a cam which is adapted for coaction with the cam follower 102 previously described. On the down movement of the handle assembly the cam 190 engages the follower 102 to axially move the shaft 31, against the action of spring 87, to the right viewing Figs. 1 and 2, and the shaft 40 and roll 46 as an assembly to thereby separate said roll from its companion roll 78 (see also Fig. 5). Thus when the handle assembly is latched down the rolls 46, 78, and 118 are separated from each other a substantially greater amount than their spacing in the up or operative position of the handle assembly. In the operative position of the handle assembly the rolls 78 and 118 are spring biased towards each other and the roll 46 is spring biased towards the rolls 78 and 118, each of said rolls being yieldable against the action of their companion biasing springs.

Referring now to Figs. 8–11, the roll 46 is a double conical roll having fluted or serrated active faces 192 and 194 which coact with the perpendicularly disposed faces 196 and 198, respectively of the filler strips 200 fed to the rolls, to feed or advance the rib and insole through the apparatus. It will be noted that the active faces 192 and 194 of the roll 46 are disposed substantially perpendicular to each other and that the face 194 is disposed in substantially parallel relation with the smooth periphery roll 118 when coacting therewith to form and lay rib 14. The conical roll 78 has a smooth active face 202 which is disposed in substantially parallel relation with face 192 of roll 46 when said rolls coact in the rib forming and laying operation. The face 202 coacts with the tape 204 to press the latter firmly into engagement with the face or flange 196 of the filler. The rolls 46 and 78 are driven at the same rotational speed but the latter roll is of smaller diameter so that a torque or twisting force will be exerted by the companion rolls on the rib 14 to bias the edge 16 of the insole into engagement with the roll 128. Thus the guide roll 128 forms a stop or guide for the insole during the rib laying operation.

With reference to Figs. 1, 3, 9 and 10, the hammer 26 has a drive part 206 which is eccentrically mounted on, and driven by, the shaft 22, the latter being rotatably mounted relative to the hammer. Extending from part 206 is a shaft 208 which is slidably mounted in the aperture 210 of sleeve 212, the latter being pivotally connected to the bracket 214 which is fixed to the frame. The part 206 has a forward part 216 which terminates in a hammer head 218 having a serrated face 220, said hammer head being disposed adjacent to and in back of the roll 78 substantially at the level of the lower corner thereof. On the rotation of the drive shaft the hammer 26 is eccentrically driven to rapidly reciprocate the hammer head into engagement with the work disposed therebelow and fed thereto during the rib laying operation. The manner of feeding the tape and filler to the rolls and hammer will now be described.

Figure 9:
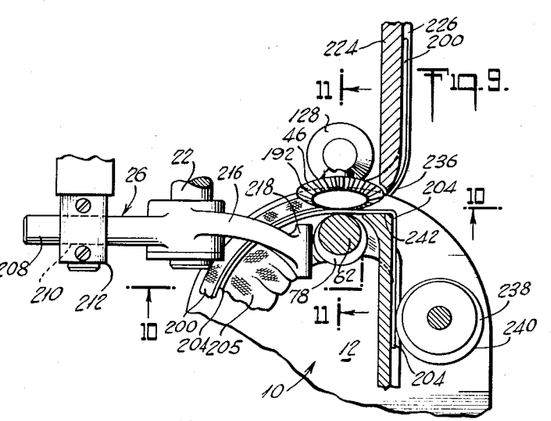
Fig. 9 is a fragmentary top plan view thereof.
Figure 10:
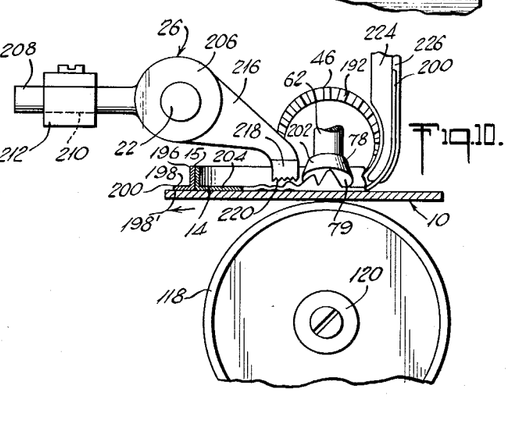

The filler 200 is conveniently supplied in roll form and may be formed of any of the usual filler materials and the filler roll is mounted on the post 222 which is suitably secured to the frame. The filler is led downwardly to the guide member 224 which defines a channel 226 of a width corresponding to the width of the filler, there being provided a retainer strap 228 at the inlet end of said channel. The guide member 224 and its companion guide member 225 are secured to the plate 226 of the frame through the intermediation of the brackets 230. The guide member 225 defines a channel 227 which at its inlet end corresponds to the width of the tape and the latter is led to said channel from the tape roll which is mounted on post 232 which in turn is mounted on the arm 234 of the frame. The inlet end of channel 227 is provided with a retainer strap 228' which corresponds to the strap 228. As shown in Figs. 8–10, the outlet end 236 of channel 226 is of arcuate configuration both longitudinally and in cross section and terminates adjacent to the lower edge of the roll 46, the filler being preliminarily folded at said outlet end prior to introduction to the rolls. The guide member 225 has a double conical idler roll 238 extending therein adjacent the bottom of the channel for forming a fold line in the tape. More particularly, the roll 238 has a peripheral edge 240 and as the tape advantages down the channel it coacts with said edge to form a longitudinal fold line in the tape, said longitudinal fold corresponding to the fold line in the tape of the rib 14. The channel 227 progressively narrows and increases in depth towards the lower end thereof which terminates at the shoulder 242 which guides the tape to the rolls and which is disposed adjacent to the lower edge of roll 78 and the outlet end of channel 226. Thus the outlet ends of channels 226 and 227 are disposed in closely adjacent relation at a common level corresponding substantially to the lower edges of the rolls 46 and 78 and said channels preliminarily fold the tape and filler for introduction to said rolls where the tape and filler are finally folded and set in a folded condition to form the rib. The roll 78 has a lower peripheral edge 79 which pressure sets the folded corner of the tape without ripples or pocket formations. As noted above, the rolls 46, 78 and 118 are spring biased towards each other and the insole 12 is fed to the surface of the roll 118 and below the rolls 46 and 78. The contacting surfaces of the filler and tape and the contacting area of the insole are adhesive coated. With the apparatus in operation and on feeding an insole through the rolls the active faces 192 and 202 of the rolls 46 and 76, respectively coact to form the upstanding wall 15 of the rib while the face 194 of the roll 46 coacts with roll 118 to pressure set the flange 198' of the filler. It will be understood that the various spring adjustment devices aforedescribed provide for the adjustment of the tension applied by the rolls to the work. The flange 205 of the tape is set by the hammer 26 and more specifically by the head 218 thereof, said head being rapidly reciprocated into engagement with said flange to uniformly set the same. The flange 205 will be pleated at the toe portion of the insole as shown in Figs. 9 and 14 but will be firmly secured in said condition to achieve a strong bond or securement between the flange and insole throughout their contacting area. The hammer is disposed immediately behind roll 78 so that the flange 205 is set immediately after the setting of the tape corner by the roll 78. It will be understood that the lower peripheral edge 79 of roll 78 is disposed at an acute angle with respect to the surface of roll 118 for coaction therewith for setting the folded corner of the tape, and that said edge 79 and the insole define therebetween an angular spacing which provides for the pleating of flange 205 at the toe portion of the insole. The faces 192 and 194 of roll 46 being fluted coact with the rib to provide for the feeding of the rib and insole through the rolls. The insole is manually fed to the rolls which form the rib and simultaneously secure the same to the insole. Accordingly the rolls secure the tape and filler to each other to form the rib which is simultaneously secured to the insole and the rib so formed provides for the feed of the insole assembly through the apparatus. The end of the layed rib is severed from the supply in any desired manner. It will be apparent from the above that the guide channels 226 and 227 provide for the proper orientation of the tape and filler for introduction to the rolls and no tension is applied to the rib after it leaves the rolls to provide a uniformly strong and quality securement in which the insole remains straight.

The distance between the upstanding wall 15 of the rib and the edge 16 of the insole is referred to as the margin and the margin is adjustable along the length of the rib in the manner now to be described. The margin is determined by the position of the roll 128 in relation to the rib forming rolls 46 and 78 and the position of roll 128 in turn is under the control of the handle assembly 104 which is laterally movable as described above for margin adjustment. The part 246 is slidably mounted on handle extension 108, the latter having a groove 248 in which there is positioned the mating projecting rib 250 of part 246. The position of part 246 relative to handle extension 108 is adjustable by means of the adjusting screws 252 and 252' which are threadedly engaged in the flanges 254 and 254', resp. of said extension and which adjust the position of part 246 between the flanges. If desired, suitable lock nuts may be associated with the adjusting screws for locking the latter in adjusted position. As best shown in Figs. 1 and 4 the part 246 is provided with a central bore 256 in which there is slidably mounted a plunger 258 which is spring biased into engagement with the thickened part 260 of the yoke 110, the plunger having a V-shaped end or pointer 262 which engages in the V-slot 264 of part 260. The plunger 258 has a shaft 266 which extends through the aperture 268 of part 246 and the end of said shaft has an enlarged head or securing device 270. The spring 272 surrounds the shaft 266 and is seated in bore 256 to bias the pointer 262 into the V-slot 264.

The plate 274 is secured to the flanges 254 and 254' of extension 108 by the screws 276 and said plate has a laterally projecting arm 278 which terminates in an indexing pointer 280. The pointer 280 is read against the companion scale 282 of yoke part 260, said scale in the illustrated embodiment being divided in 1/32 of an inch increments from 0 to 10, the numeral 6 being the neutral setting of the illustrated embodiment at the apex of slot 264. The handle assembly 104 is laterally or horizontally movable to adjust the margin and in the illustrated example when the handle 106 is moved to index the pointer 262 on the numeral 3, a 3/32 of an inch margin is obtained which is also 3/32 of an inch less margin than that obtained at the neutral setting. Similarly when the handle is moved to index the pointer on the numeral 8 for example an 8/32 of an inch margin is obtained which is 2/32 of inch larger margin than that obtained at the neutral setting. The adjustable stop screws 284 and 284' are threadedly engaged in the flanges 286 and 286', resp. of yoke 110 and coact with the handle extension 108 to limit the horizontal movement of the latter to the desired margin settings. Thus two adjustable margin settings are obtainable with respect to the neutral setting by means of the screws 284 and 284', the screw 284 giving the smaller margin setting and the screw 284' giving the larger margin setting. Assuming the desired margin at the toe A is 6, at the side B is 2 and at the shank C is 8, the handle 106 is moved to a position in which the pointer 280 is indexed at numeral 6 and in this position the plunger block or part 246 is adjusted as described above so that the plunger pointer 262 is indexed at the apex of slot 264 as shown in Fig. 1. To obtain the side margin 2 the handle is moved to index the pointer 280 at numeral 2 and in this position the stop screw 284 is adjusted to abut the extension 108. Similarly to obtain the shank margin 8, the handle is moved to index the pointer 280 at numeral 8 and in this position the stop screw 284' is adjusted to abut the extension 108. In this manner the three margin settings are obtained, it being noted that the plunger 258 is retractable inwardly of block 246 on the lateral movement of the handle from the neutral setting. On the release of the handle it will automatically assume a neutral setting due to the action of the spring biased plunger 258 with respect to the slot 264. In practice, the side and shank margins are obtained by the operator movement of the handle 106 from the neutral setting and against stops 284 and 284', to correspondingly move the roll 128, during the feeding of the insole through the apparatus.

From the above it will be apparent that the rib laying apparatus or rib setting machine includes a pivotally mounted arm or assembly 104 which carries a sole support 118 and a hand lever or handle 106, there being a sole edge gauge or roll 128 also carried by and movable with said arm. The lever and sole gauge are thus operatively connected and limit stops, constituted by screws 284 and 284', adjustably determine the range of movement of said lever. The slot 264 constitutes a fixed intermediate stop and a cooperating dog or plunger 258 carried by the lever determines an intermediate position thereof, there being adjusting screws 252 and 252' carried by the lever for adjusting the position of said plunger.

Figure 12:
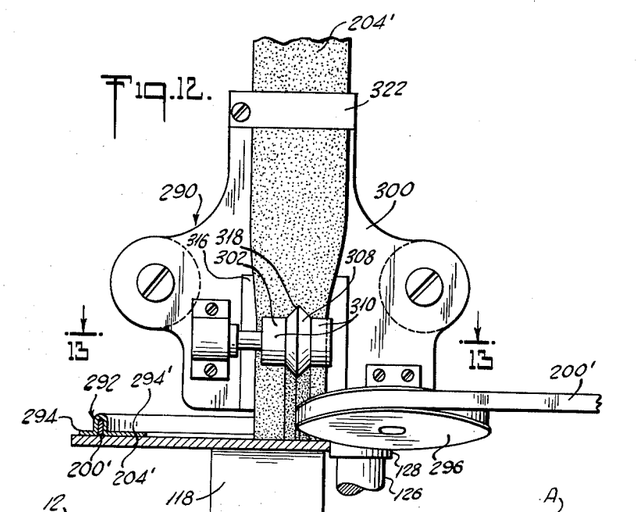
Fig. 12 is a view similar to Fig. 8 showing an attachment for the rib applying apparatus for forming another type of rib.
Figure 13:
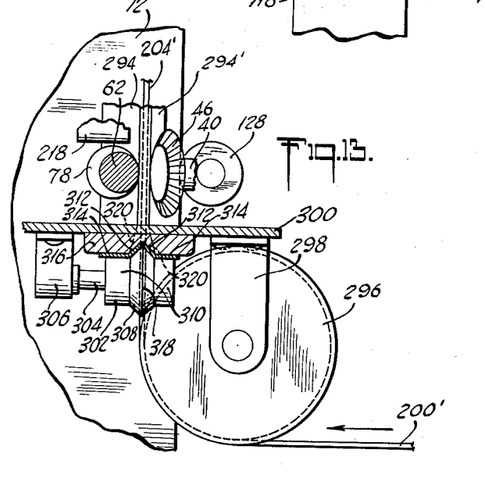
Fig. 13 is a sectional view taken on the line 13—13 of Fig. 12.

With reference to Figs. 12 and 13, an attachment 290 is shown for forming the rib 292 in which the filler 200' is disposed upright of the insole in a straight condition within the tape 204'. The tape 204' is secured to the filler at their contacting areas and the flanges 294 and 294' of the tape are secured to the insole. The attachment 290 replaces the guide members 224 and 225 on the brackets 230 carried by plate 226. The attachment 290 comprises a filler feed roll 296 which is rotatably mounted on the brackets 298 carried by the plate 300, said roll being an idler roll and disposed so as to feed the filler to the surface of the insole in properly oriented upright position with respect to the tape. It will be understood that the filler and tape may be led to the attachment from any suitable source of supply. The tape roll 302 is an idler roll and the shaft 304 thereof is rotatably mounted in the bracket 306 mounted on the plate 300. The roll 302 includes a double conical part 308 and flanges 310 which coact with the companion V-groove 312 and flat surfaces 314, resp. of block 316 to preliminarily shape the tape to receive the filler and to approximate the final shape of the tape component of the rib. The block 316 is suitably secured to the plate 300 and said block and its companion roll 302 are mounted above the roll 296 so that the filler feed to the tape is aligned with the edge 318 of the tape roll 302. The bottom of the block 316 is smoothly contoured as indicated at 320 at the continuation of the groove 312 to effect a smooth transition from the vertically downward feed of the tape to the horizontal feed thereof with the filler to the rib forming and feeding rolls previously described in detail. These latter rolls form the rib 292, firmly secure the tape flanges to the insole, and feed the attached rib and insole through the apparatus. The tape is fed to the top of the attachment 290 between the plate 300 and the retainer strap 322 as shown in Fig. 12. Thus the same basic apparatus 18 may be utilized to form a rib of the character of rib 14 or a rib of the character of rib 292.

If desired, the instant apparatus may be used to secure a previously formed rib of the aforedescribed types to an insole and to feed the rib and insole through the apparatus.

While there is shown and described herein certain specific structure embodying the invention it will be manifest to those skilled in the art that various modifications and rearrangements of the parts may be made without departing from the spirit and scope of the underlying inventive concept and that the same is not limited to the particular form herein shown and described except insofar as indicated by the scope of the appended claims.

Having thus described my invention what I claim as new and desire to secure by Letters Patent is:

1. Apparatus for simultaneously forming and laying a rib on an insole, comprising a supporting frame, a companion pair of rolls one of which is a single conical roll and the other of which is a double conical roll mounted in said frame, said rolls having conical surfaces disposed in substantially parallel relation at adjacent sides for forming a rib from tape and filler strip material fed thereto, auxiliary support means mounted in said frame for vertical and lateral movement, a cylindrical roll and guide roll mounted on said support means for movement in unison therewith, the other conical surface of said other roll being disposed in substantially parallel relation with said cylindrical roll for setting one rib flange to the insole simultaneous with the formation of the rib, and means disposed rearwardly of said one roll for setting the other rib flange to the insole, said support means being laterally movable with respect to said companion rolls for providing a margin adjustment of the rib along the length thereof and vertically movable for relative separation from said companion rolls, said support means comprising a member pivotally mounted on said frame for vertical movement and another companion member pivotally mounted on said first member for lateral movement, said cylindrical and guide rolls being carried by said another member, and means for biasing said members in a mutually engaging direction, said members being vertically movable in a downward direction to an extreme open position for relative separation of said cylindrical and guide rolls from said companion rolls, said other roll being laterally movable with respect to said one roll to provide for the relative separation thereof, means responsive to the vertical movement of said members for laterally moving said other roll, and means for releasably latching said members in said extreme open position with said other roll disposed in said relative separated position.

2. In rib applying apparatus of the character described, a companion pair of upper rolls comprising a single and double conical roll, and a generally cylindrical lower roll disposed for coaction with said upper rolls, said upper rolls having conical confronting surfaces disposed in substantially parallel relation for coaction with an upstanding rib of an insole fed therebetween, the other conical surface of said double conical roll being disposed in substantially parallel relation with said cylindrical roll for setting one rib flange to the insole as the latter advances between said upper and lower rolls, said single conical roll having its lower peripheral edge in a plane disposed at an acute angle with respect to the confronting surface of said lower roll for coaction therewith for setting an adjacent folded corner of the other rib flange to the insole as the latter advances between said upper and lower rolls, said plane of the lower peripheral edge and the insole defining therebetween an angular spacing providing for the pleating of said other flange at the toe portion of the insole, and means disposed rearwardly of said single conical roll at substantially a common level therewith for setting said other flange to the insole.

3. In rib applying apparatus, a companion pair of upper rolls comprising a single and double conical roll, and a lower support roll disposed for coaction with said upper rolls, said upper rolls having conical confronting surfaces disposed in substantially parallel relation for coaction with an upstanding rib of an insole fed therebetween, the other conical surface of said double conical roll being disposed in substantially parallel relation with said lower roll for setting one rib flange to the insole as the latter advances between said upper and lower rolls, said single conical roll having its lower peripheral edge in a plane disposed at an acute angle with respect to the confronting surface of said lower roll for coaction therewith for setting an adjacent folded corner of the other rib flange to the insole as the latter advances between said plane of the upper and lower rolls, said lower peripheral edge and the insole defining therebetween spacing providing for the pleating of said flange at the toe portion of the insole, and means disposed rearwardly of said single conical roll at substantially a common level therewith for setting said other flange to the insole.

4. In a rib applying apparatus of the character described, a companion pair of upper rolls comprising a single and double conical roll, and a generally cylindrical lower roll disposed for coaction with said upper rolls, said upper rolls having conical confronting surfaces disposed in substantially parallel relation for coaction with an upstanding rib of an insole fed therebetween, the other conical surface of said double conical roll being disposed in substantially parallel relation with said cylindrical roll for setting one rib flange to the insole as the latter advances between said upper and lower rolls, said single conical roll having its lower peripheral edge in a plane disposed at an acute angle with respect to the confronting surface of said lower roll for coaction therewith for setting an adjacent folded corner of the other rib flange to the insole as the latter advances between said plane of the upper and lower rolls, said lower peripheral edge and the insole defining therebetween an angular spacing providing for the pleating of said other flange at the toe portion of the insole, and means disposed rearwardly of said single conical roll at substantially a common level therewith for setting said other flange to the insole, said double conical roll having a peripherally interrupted conical surface for feeding the rib and insole through the apparatus.

5. In rib applying apparatus, a companion pair of upper rolls comprising a single and double conical roll, and a lower support roll disposed for coaction with said upper rolls, said upper rolls having conical confronting surfaces disposed in substantially parallel relation for coaction with an upstanding rib of an insole fed therebetween, the other conical surface of said double conical roll being disposed in substantially parallel relation with said lower roll for setting one rib flange to the insole as the latter advances between said upper and lower rolls, said single conical roll having its lower peripheral edge in a plane disposed at an acute angle with respect to the confronting surface of said said lower roll for coaction therewith for setting an adjacent folded corner of the other rib flange to the insole as the latter advances between said upper and lower rolls, said plane of the lower peripheral edge and the insole defining therebetween spacing providing for the pleating of said flange at the toe portion of the insole, and rapidly reciprocating hammer means disposed rearwardly of said single conical roll at substantially a common level therewith for setting said other flange to the insole.

6. Apparatus of the character described, comprising three shafts disposed in triangular relation in substantially a common plane, complemental rolls mounted on the respective shafts, one of said rolls being single conical, a second roll being double conical and a third roll being cylindrical, said first and second rolls having coacting conical faces and said second roll having the other conical face thereof coacting with said third roll for applying pressure to the opposite sides of a rib and for pressure setting an adjacent flange of the rib to an insole, respectively as the latter is fed to said rolls, said first roll having its lower peripheral edge in a plane disposed at an acute angle with respect to the confronting surface of said third roll for coaction therewith for setting an adjacent folded corner of the other rib flange to the insole simultaneously with the setting of said first mentioned flange, the plane of said lower peripheral edge and said third roll defining therebetween an angular spacing providing for the pleating of said other flange at the toe portion of the insole, and means disposed rearwardly of said one roll at the level thereof for engagement with the surface of said other rib flange for setting the latter to the insole subsequent to the setting of the folded corner.

7. In rib applying apparatus, a companion pair of upper rolls comprising a single and double conical roll, and a lower support roll disposed for coaction with said upper rolls, said upper rolls having conical confronting surfaces disposed in substantially parallel relation for coaction with an upstanding rib of an insole fed therebetween, the other conical surface of said double conical roll being disposed in substantially parallel relation with said lower roll for setting one rib flange to the insole as the latter advances between said upper and lower rolls, said single conical roll having its lower peripheral edge in a plane disposed at an acute angle with respect to the confronting surface of said lower roll for coaction therewith for setting an adjacent folded corner of the other rib flange to the insole as the latter advances between said upper and lower rolls, the plane of said lower peripheral edge and the insole defining therebetween spacing providing for the pleating of said flange at the toe portion of the insole, and means disposed rearwardly of said single conical roll at substantially a common level therewith for setting said other flange to the insole, and means positioned laterally adjacent to said lower roll for guiding an adjacent peripheral edge of the insole as the latter advances between said rolls, said last mentioned means comprising a roll extending above the level of said lower roll in fixed relation therewith.

8. In rib applying apparatus, a companion pair of upper rolls comprising a single and double conical roll, and a lower support roll disposed for coaction with said upper rolls, said upper rolls having conical confronting surfaces disposed in substantially parallel relation for coaction with an upstanding rib of an insole fed therebetween, the other conical surface of said double conical roll being disposed in substantially parallel relation with said lower roll for setting one rib flange to the insole as the latter advances between said upper and lower rolls, said single conical roll having its lower peripheral edge in a plane disposed at an acute angle with respect to the confronting surface of said lower roll for coaction therewith for setting an adjacent folded corner of the other rib flange to the insole as the latter advances between said upper and lower rolls, the plane of said lower peripheral edge and the insole defining therebetween spacing providing for the pleating of said flange at the toe portion of the insole, and means disposed rearwardly of said single conical roll at substantially a common level therewith for setting said other flange to the insole, and means positioned laterally adjacent to said lower roll for guiding an adjacent peripheral edge of the insole as the latter advances between said rolls, said last mentioned means comprising a roll extending above the level of said lower roll in fixed relation therewith, said lower and guide rolls being mounted for conjoint lateral movement with respect to said upper rolls for concomitantly adjusting the margin of the rib along the length thereof.

9. In rib applying apparatus, a companion pair of upper rolls comprising a single and double conical roll, and a lower support roll disposed for coaction with said upper rolls, said upper rolls having conical confronting surfaces disposed in substantially parallel relation for coaction with an upstanding rib of an insole fed therebetween, the other conical surface of said double conical roll being disposed in substantially parallel relation with said lower roll for setting one rib flange to the insole as the latter advances between said upper and lower rolls, said single conical roll having its lower peripheral edge in a plane disposed at an acute angle with respect to the confronting surface of said lower roll for coaction therewith for setting an adjacent folded corner of the other rib flange to the insole as the latter advances between said upper and lower rolls, the plane of said lower peripheral edge and the insole defining therebetween spacing providing for the pleating of said flange at the toe portion of the insole, and means disposed rearwardly of said single conical roll at substantially a common level therewith for setting said other flange to the insole, and means positioned laterally adjacent to said lower roll for guiding an adjacent peripheral edge of the insole as the latter advances between said rolls, said last mentioned means comprising a roll extending above the level of said lower roll in fixed relation therewith, said lower and guide rolls being mounted for conjoint lateral movement with respect to said companion pair of rolls for providing a margin adjustment of the rib along the length thereof, said lower and guide rolls being vertically movable with respect to said companion pair of rolls for relative separation from the latter.

10. Apparatus for simultaneously forming and laying a rib on an insole, comprising a supporting frame, a companion pair of rolls one of which is a single conical roll and the other of which is a double conical roll mounted in said frame, said rolls having conical surfaces disposed in substantially parallel relation at adjacent sides for forming a rib from tape and filler strip material fed thereto, auxiliary support means mounted in said frame for vertical and lateral movement, a cylindrical roll and guide roll mounted on said support means for movement in unison therewith, the other conical surface of said other roll being disposed in substantially parallel relation with said cylindrical roll for setting one rib flange to the insole simultaneous with the formation of the rib, said one roll having its lower peripheral edge in a plane disposed at an acute angle with respect to said cylindrical roll for setting an adjacent folded corner of the other rib flange to the insole simultaneous with the formation of the rib, the plane of said lower peripheral edge and the insole defining therebetween an angular spacing providing for the pleating of said other flange at the toe portion of the insole, and means disposed rearwardly of said one roll for setting said other rib flange to the insole, said auxiliary support means being laterally movable with respect to said companion rolls for providing a margin adjustment of the rib along the length thereof and vertically movable for relative separation from said companion rolls.

11. Apparatus for simultaneously forming and laying a rib on an insole, comprising a supporting frame, a companion pair of rolls one of which is a single conical roll and the other of which is a double conical roll mounted in said frame, said rolls having conical surfaces disposed in substantially parallel relation at adjacent sides for forming a rib from tape and filler strip material fed thereto, auxiliary support means mounted in said frame for vertical and lateral movement, a cylindrical roll and guide roll mounted on said support means for movement in unison therewith, the other conical surface of said other roll being disposed in substantially parallel relation with said cylindrical roll for setting one rib flange to the insole simultaneous with the formation of the rib, said one roll having its lower peripheral edge in a plane disposed at an acute angle with respect to said cylindrical roll for setting an adjacent folded corner of the other rib flange to the insole simultaneous with the formation of the rib, the plane of said lower peripheral edge and the insole defining therebetween an angular spacing providing for the pleating of said other flange at the toe portion of the insole, and means disposed rearwardly of said one roll for setting said other rib flange to the insole, said auxiliary support means being laterally movable with respect to said companion rolls for providing a margin adjustment of the rib along the length thereof and vertically movable for relative separation from said companion rolls, said auxiliary support means comprising a member pivotally mounted on said frame for vertical movement and another companion member pivotally mounted on said first member for lateral movement, said cylindrical and guide rolls being carried by said another member, and means for biasing said members towards each other.

12. Apparatus for simultaneously forming and laying a rib on an insole, comprising a supporting frame, a companion pair of rolls one of which is a single conical roll and the other of which is a double conical roll mounted in said frame, said rolls having conical surfaces disposed in substantially parallel relation at adjacent sides for forming a rib from tape and filler strip material fed thereto, auxiliary support means mounted in said frame for vertical and lateral movement, a cylindrical roll and guide roll mounted on said support means for movement in unison therewith, the other conical surface of said other roll being disposed in substantially parallel relation with said cylindrical roll for setting one rib flange to the insole simultaneous with the formation of the rib, said one roll having its lower peripheral edge in a plane disposed at an acute angle with respect to said cylindrical roll for setting an adjacent folded corner of the other rib flange to the insole simultaneous with the formation of the rib, the plane of said lower peripheral edge and the insole defining therebetween an angular spacing providing for the pleating of said other flange at the toe portion of the insole, and means disposed rearwardly of said one roll for setting said other rib flange to the insole, said auxiliary support means being laterally movable with respect to said companion rolls for providing a margin adjustment of the rib along the length thereof and vertically movable for relative separation from said companion rolls, said auxiliary support means comprising a member pivotally mounted on said frame for vertical movement and another companion member pivotally mounted on said first member for lateral movement, said cylindrical and guide rolls being carried by said another member, and means for biasing said members towards each other, said members having indexing means for presetting the lateral position and margin adjustment of said another member with respect to said first member.

13. Apparatus for simultaneously forming and laying a rib on an insole, comprising a supporting frame, a companion pair of rolls one of which is a single conical roll and the other of which is a double conical roll mounted in said frame, said rolls having conical surfaces disposed in substantially parallel relation at adjacent sides for forming a rib from tape and filler strip material fed thereto, auxiliary support means mounted in said frame for vertical and lateral movement, a cylindrical roll and guide roll mounted on said support means for movement in unison therewith, the other conical surface of said other roll being disposed in substantially parallel relation with said cylindrical roll for setting one rib flange to the insole simultaneous with the formation of the rib, said one roll having its lower peripheral edge in a plane disposed at an acute angle with respect to said cylindrical roll for setting an adjacent folded corner of the other rib flange to the insole simultaneous with the formation of the rib, the plane of said lower peripheral edge and the insole defining therebetween an angular spacing providing for the pleating of said other flange at the toe portion of the insole, and means disposed rearwardly of said one roll for setting said other rib flange to the insole, said auxiliary support means being laterally movable with respect to said companion rolls for providing a margin adjustment of the rib along the length thereof and vertically movable for relative separation from said companion rolls, said auxiliary support means comprising a member pivotally mounted on said frame for vertical movement and another companion member pivotally mounted on said first member for lateral movement, said cylindrical and guide rolls being carried by said another member, and means for biasing said members towards each other, said members having complementary interengageable parts disposed to register in a neutral position of said another member, one of said parts being laterally adjustable to establish said neutral position, and adjustable stop means interengageable with said another member to limit the lateral movement of said another member at opposite sides of said neutral position whereby said another member may be preset at said neutral position and set at two different predetermined margin positions.

14. Apparatus for simultaneously forming and laying a rib on an insole, comprising a supporting frame, a companion pair of rolls one of which is a single conical roll and the other of which is a double conical roll mounted in said frame, said rolls having conical surfaces disposed in substantially parallel relation at adjacent sides for forming a rib from tape and filler strip material fed thereto, auxiliary support means mounted in said frame for vertical and lateral movement, a cylindrical roll and guide roll mounted on said support means for movement in unison therewith, the other conical surface of said other roll being disposed in substantially parallel relation with said cylindrical roll for setting one rib flange to the insole simultaneous with the formation of the rib, said one roll having its lower peripheral edge in a plane disposed at an acute angle with respect to said cylindrical roll for setting an adjacent folded corner of the other rib flange to the insole simultaneous with the formation of the rib, the plane of said lower peripheral edge and the insole defining therebetween an angular spacing providing for the pleating of said other flange at the toe portion of the insole, and means disposed rearwardly of said one roll for setting said other rib flange to the insole, said auxiliary support means being laterally movable with respect to said companion rolls for providing a margin adjustment of the rib along the length thereof and vertically movable for relative separation from said companion rolls, said auxiliary support means comprising a member pivotally mounted on said frame for vertical movement and another companion member pivotally mounted on said first member for lateral movement, said cylindrical and guide rolls being carried by said another member, and means for biasing said members towards each other, said first member having a V-slot and said another member having a laterally adjustable block provided with an axially movable and spring projected plunger terminating in a V-part formed complementary to said slot, said block being laterally adjustable for adjusting said plunger to a neutral position in which said V-part thereof registers with said V-slot, and adjustable stop means carried by said first member for engagement with said another member to limit the lateral movement of the latter at opposite sides of said neutral position whereby said another member may be preset at said neutral position and set at two different predetermined margin positions.

15. Apparatus for simultaneously forming and laying a rib on an insole, comprising a supporting frame, a companion pair of rolls one of which is a single conical roll and the other of which is a double conical roll mounted in said frame, said rolls having conical surfaces disposed in substantially parallel relation at adjacent sides for forming a rib from tape and filler strip material fed thereto, auxiliary support means mounted in said frame for vertical and lateral movement, a cylindrical roll and guide roll mounted on said support means for movement in unison therewith, the other conical surface of said other roll being disposed in substantially parallel relation with said cylindrical roll for setting one rib flange to the insole simultaneous with the formation of the rib, said one roll having its lower peripheral edge in a plane disposed at an acute angle with respect to said cylindrical roll for setting an adjacent folded corner of the other rib flange to the insole simultaneous with the formation of the rib, the plane of said lower peripheral edge and the insole defining therebetween an angular spacing providing for the pleating of said other flange at the toe portion of the insole, and means disposed rearwardly of said one roll for setting said other rib flange to the insole, said auxiliary support means being laterally movable with respect to said companion rolls for providing a margin adjustment of the rib along the length thereof and vertically movable for relative separation from said companion rolls, said auxiliary support means comprising a member pivotally mounted on said frame for vertical movement and another companion member pivotally mounted on said first member for lateral movement, said cylindrical and guide rolls being carried by said another member, and means for biasing said members towards each other, said members being vertically movable in a downward direction to an extreme open position for relative separation of said cylindrical and guide rolls from said companion rolls, and means for releasably latching said members in said extreme open position.

16. In a rib setting machine a pivotally mounted arm carrying a sole support and a hand lever, a sole edge gauge also carried by and movable with the arm, operating connections between the lever and gauge, limit stops for adjustably determining the range of movement of the lever, a fixed intermediate stop, a cooperating dog carried by the lever for determining an intermediate position thereof, and means carried by the lever for adjusting the position of the dog therein.

References Cited in the file of this patent
UNITED STATES PATENTS

| | | |
|---|---|---|
| 180,419 | Dargan | Aug. 1, 1876 |
| 1,281,831 | Pool | Oct. 15, 1918 |
| 2,042,275 | Pool | May 26, 1936 |
| 2,091,185 | Poole et al. | Aug. 24, 1937 |
| 2,142,332 | Ridderstrom | Jan. 3, 1939 |
| 2,594,470 | Mariner | Apr. 29, 1952 |
| 2,668,759 | Clark | Sept. 14, 1954 |

FOREIGN PATENTS

| | | |
|---|---|---|
| 485,927 | Italy | Oct. 22, 1953 |